United States Patent
Gotou

(10) Patent No.: US 9,346,166 B2
(45) Date of Patent: May 24, 2016

(54) APPARATUS AND METHOD OF TAKING OUT BULK STORED ARTICLES BY ROBOT

(71) Applicant: FANUC CORPORATION, Minamitsuru-gun, Yamanashi (JP)

(72) Inventor: Takefumi Gotou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 183 days.

(21) Appl. No.: 14/012,748

(22) Filed: Aug. 28, 2013

(65) Prior Publication Data

US 2014/0067127 A1 Mar. 6, 2014

(30) Foreign Application Priority Data

Aug. 29, 2012 (JP) ................................. 2012-188485

(51) Int. Cl.
*B25J 9/16* (2006.01)

(52) U.S. Cl.
CPC ....... *B25J 9/1697* (2013.01); *G05B 2219/37567* (2013.01); *G05B 2219/39476* (2013.01); *G05B 2219/40053* (2013.01)

(58) Field of Classification Search
CPC .......... B25J 9/00; B25J 19/00; B25J 19/0007
See application file for complete search history.

(56) References Cited

U.S. PATENT DOCUMENTS

| 4,017,721 A * | 4/1977 | Michaud .................... B25J 9/00 348/94 |
| 4,985,846 A | 1/1991 | Fallon |
| 6,857,174 B2 * | 2/2005 | Morita .................... B23P 19/02 29/240 |
| 8,964,001 B2 * | 2/2015 | Fujieda ................. G06T 7/0075 348/47 |
| 2013/0151007 A1 * | 6/2013 | Valpola .................. B25J 9/1694 700/245 |

FOREIGN PATENT DOCUMENTS

| CN | 1730248 A | 2/2006 |
| CN | 101370624 A | 2/2009 |
| EP | 2145738 A2 | 1/2010 |
| JP | 11-300683 A | 11/1999 |
| JP | 2004-295223 A | 10/2004 |
| JP | 2011-179909 A | 9/2011 |
| JP | 2011167815 A | 9/2011 |

* cited by examiner

*Primary Examiner* — Nicholas Kiswanto
(74) *Attorney, Agent, or Firm* — Hauptman Ham, LLP

(57) ABSTRACT

An article take-out apparatus including: a 3D measuring device measuring surface positions of a plurality of articles stored in bulk in a 3D space so as to acquire position information of a plurality of 3D points; a connected set processing unit determining connected sets made by connecting 3D points which are close to each other, from the plurality of 3D points acquired by the 3D measuring device; an article identifying unit identifying positions and postures of the articles, based on position information of 3D points belonging to the connected sets; a hand position and posture processing unit determining positions and postures of the hand capable of taking out the identified articles; and a robot control unit controlling a robot to move the hand to the positions and postures determined by the hand position and posture processing unit and take out the articles.

8 Claims, 11 Drawing Sheets

APPARATUS AND METHOD OF TAKING OUT BULK STORED ARTICLES BY ROBOT

RELATED APPLICATIONS

The present application is based on, and claims priority from, Japanese Application Number 2012-188485, filed Aug. 29, 2012, the disclosure of which is hereby incorporated by reference herein in its entirety.

BACKGROUND OF THE INVENTION

1. Field of the Invention

The present invention relates to an article take-out apparatus and article take-out method which recognize the positions and postures of articles stored in bulk in a 3D space and take out recognized articles using a robot.

2. Description of the Related Art

As this type of apparatus, in the past, there has been known an apparatus designed to recognize the positions of articles stored in bulk by carrying out pattern matching on a 2D image obtained by photographing the articles stored in bulk with a camera or on a 3D point set obtained by measurement with a 3D measuring device.

For example, Japanese Unexamined Patent Publication No. 2004-295223A (JP2004-295223A) describes an apparatus which prepares a 2D model pattern from a 2D image which is obtained by photographing an article in a reference 3D relative posture in advance, processes the 2D model pattern by 2D geometric conversion to prepare a plurality of converted 2D model patterns, and uses the plurality of converted 2D model patterns to carry out 2D pattern matching on a 2D image of an article.

Further, for example, the apparatus described in Japanese Unexamined Patent Publication No. 2011-179909A (JP2011-179909A) acquires a 3D model pattern of an article from a CAD model, etc. in advance while measuring the surface of the article in a 3D space by a 3D measuring device to acquire a 3D point set (distance image), and divides this 3D point set into sub-regions which are surrounded by edges extracted from the 3D point set. Further, first, one of the sub-regions is set as an article region. Processing for matching a 3D model pattern with this article region and processing for updating which adds another sub-region to the article region, that is, two processings, are repeated to measure the position and posture of an article.

However, the apparatuses which are described in JP2004-295223A and JP2011-179909A require the preparation of a 2D model pattern or 3D model pattern in advance for each type of article, so troublesome work is required. In particular, when there are a large number of types of articles, it is necessary to prepare that number's worth of model patterns, so tremendous work is required. Further, in the case of irregularly shaped articles, it is inherently not possible to create model patterns, so application is impossible.

SUMMARY OF THE INVENTION

According to one aspect of the present invention, the article take-out apparatus includes: a robot having a hand capable of holding an article; a 3D measuring device measuring surface positions of a plurality of articles stored in bulk in a 3D space so as to acquire position information of a plurality of 3D points; a connected set processing unit determining connected sets made by connecting 3D points which are close to each other, from the plurality of 3D points acquired by the 3D measuring device; an article identifying unit identifying positions and postures of the articles, based on position information of 3D points belonging to the connected sets; a hand position and posture processing unit determining positions and postures of the hand capable of taking out the articles, the positions and postures of the articles being identified by the article identifying unit; and a robot control unit controlling the robot to move the hand to the positions and postures determined by the hand position and posture processing unit and take out the articles.

Further, according to another aspect of the present invention, the article take-out method of taking out articles stored in bulk in a 3D space by using a robot having a hand capable of holding an article, includes: measuring surface positions of a plurality of articles stored in bulk by a 3D measuring device to acquire position information of a plurality of 3D points; determining connected sets made by connecting 3D points which are close to each other, from the plurality of 3D points acquired by the 3D point measuring device; identifying positions and postures of articles based on position information of 3D points belonging to the connected sets; determining positions and postures of the hand capable of taking out the articles, the positions and postures of the articles being identified; and controlling the robot to move the hand to the positions and postures of the hand and take out the articles.

BRIEF DESCRIPTION OF THE DRAWINGS

The object, features, and advantages of the present invention will become clearer from the following explanation of embodiments given with reference to the attached drawings, in which.

DETAILED DESCRIPTION

Figure 1:
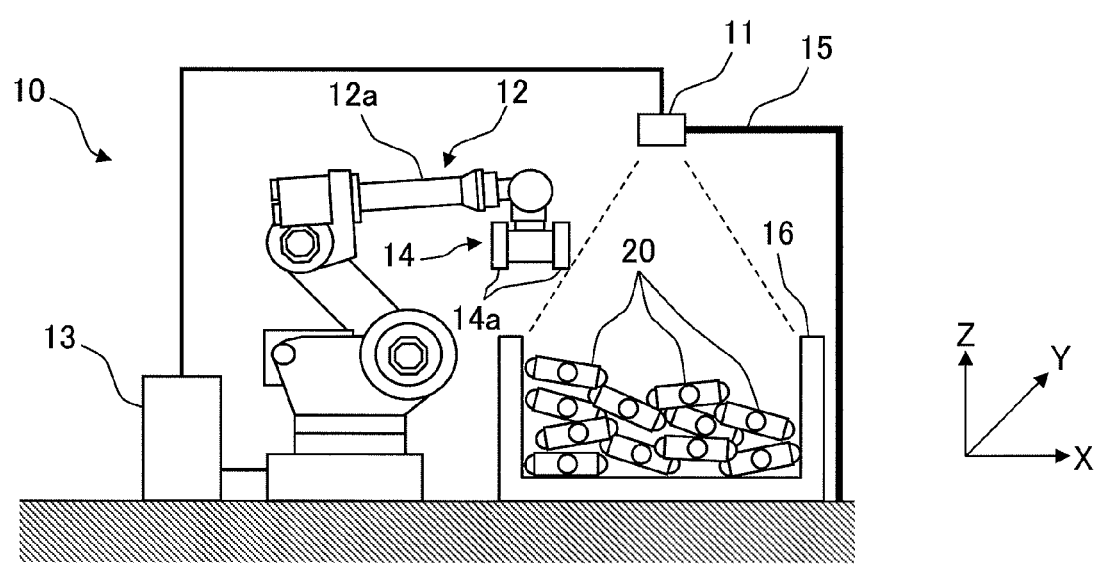
FIG. 1 is a view which shows the schematic configuration of an article take-out apparatus according to one embodiment of the present invention.

Below, referring to FIG. 1 to FIG. 16, an article take-out apparatus 10 according to an embodiment of the present invention will be explained. FIG. 1 is a view which shows the schematic configuration of an article take-out apparatus 10 according to one embodiment of the present invention. The article take-out apparatus 10 includes a 3D measuring device 11, a robot 12, and a robot control device 13 which connects the 3D measuring device 11 and the robot 12 and controls the robot 12. The robot 12 has a hand 14 which is attached to a front end of an arm 12a. A container 16 is arranged at the side of the robot 12. FIG. 1 also shows a XYZ Cartesian coordinate system. The Z-direction is the vertical direction, while the X-direction and Y-direction are horizontal directions. The container 16 is shown on the XZ flat surface.

Inside an open top container 16, a plurality of articles 20 are stored in bulk. The article take-out apparatus 10 of the present embodiment recognizes the positions and postures of the articles 20 to be taken out from the state of bulk storage of this plurality of articles 20, takes out and holds a recognized article 20 from inside of the container 16 by the hand 14, and conveys it to a predetermined position outside of the container 16 by operation of the robot 12. The plurality of articles 20 are illustrated in FIG. 1 as being the same shape as each other, but may also include irregularly shaped articles or a plurality of types of articles. Below, an article 20 which is held by the hand 14 will sometimes be referred to as a "held article 21" (see FIG. 11) to differentiate it from the other articles in the container 16.

The hand 14 has a pair of holders 14a which can be raised and lowered by a not shown elevation mechanism. The holders 14a are usually in the raised state such as shown in FIG. 1. They descend from this raised state to pick up articles 20, then are again raised. Due to this, held articles 21 are taken out upward from the other articles 20 (direction in which holders 14a rise). When the robot 12 is operated to convey the held articles 21, collision of the held articles 21 or the hand 14 with other articles 20 inside of the container 16 can be avoided.

The 3D measuring device 11 is arranged above the center part of the container 16, and measures the surfaces of articles 20 which are exposed from the articles 20 which are stored in bulk inside the container 16 so as to acquire a plurality of 3D points of position information (3D information). The measurement range of the 3D measuring device 11 has to include the container 16. However, if the measurement range is too large, a drop in the measurement resolution will be invited. Therefore, the measurement range is preferably made equal to the range occupied by the container 16, for example, is made to match the range occupied by the container 16. In FIG. 1, the 3D measuring device 11 is fastened to a dedicated frame 15. However, the 3D measuring device 11 may also be attached to the front end of the robot 12. The 3D measuring device 11 and the robot control device 13 are connected together by a communication cable or other communication portion and can communicate with each other.

As the 3D measuring device 11, one of various non-contact systems may be utilized. For example, a stereo system using two cameras, a laser slit scanning system, a laser spot scanning system, a system using a projector or other device to project a pattern of light on articles, a system utilizing the travel time of light from being emitted from a laser emitter to being reflected at the surface of articles and entering a light receiver, etc. may be mentioned.

The 3D measuring device 11 expresses the acquired 3D information in the form of a distance image or 3D map. A "distance image" expresses 3D information in an image format and expresses the height of a position on the image or distance from the 3D measuring device 11 by using the brightness or color of the pixels of the image. On the other hand, a "3D map" expresses 3D information as a set of measured 3D coordinate values (x, y, z). In the present embodiment, a pixel in a distance image or a point having 3D coordinate values in a 3D map will be called a "3D point", while a set of a plurality of 3D points will be called a "3D point set". A 3D point set is the set of the entire 3D points which are measured by the 3D measuring device 11 and can be acquired by the 3D measuring device 11.

The hand 14 can take out and hold an article 20. As the type of hand which can do this, for example, a suction nozzle, pickup magnet, suction pad, chuck, etc. may be mentioned. Further, the hand 14 is controlled in its position and posture by operation of the robot 12.

Figure 2:
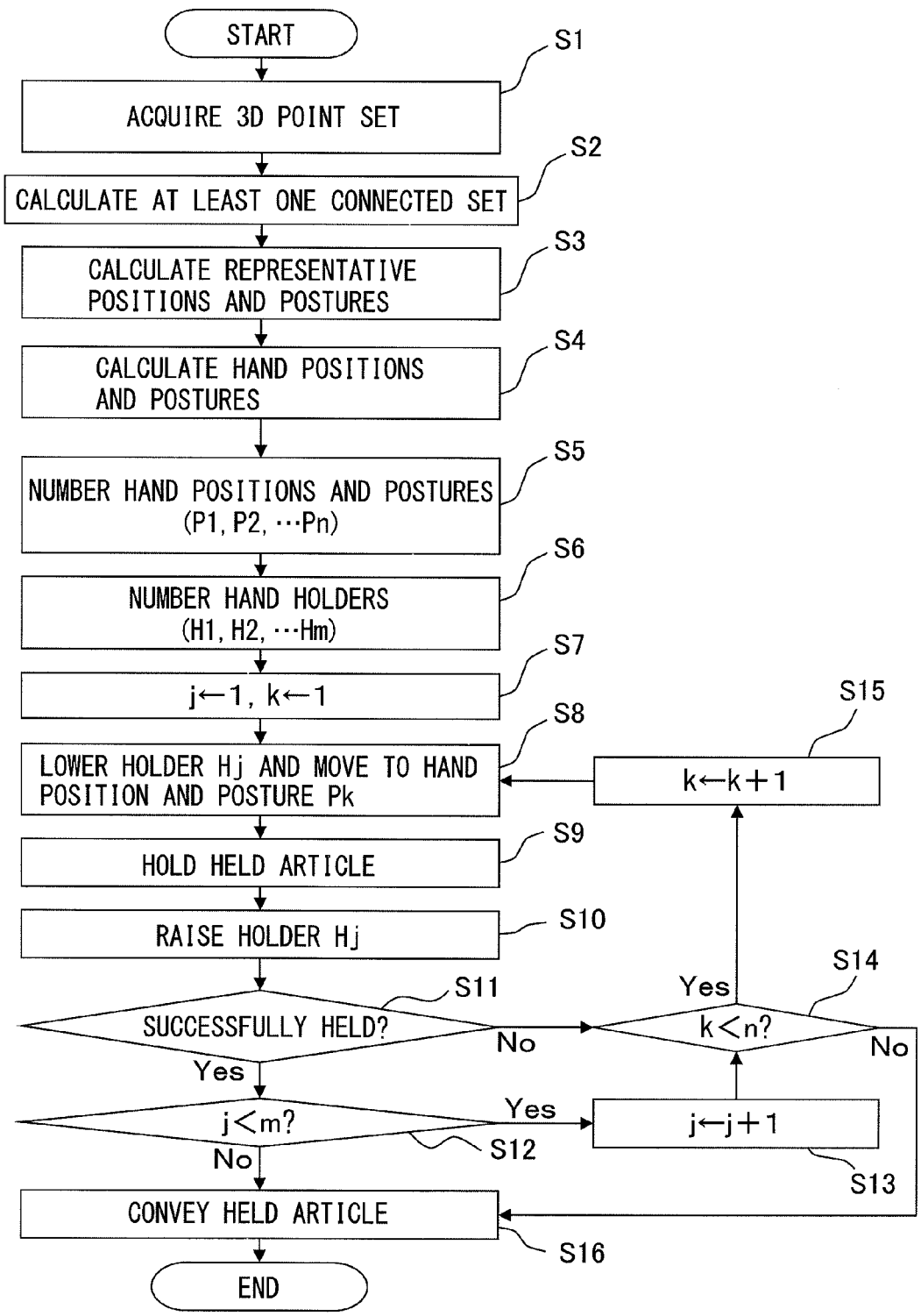
FIG. 2 is a flow chart which shows an example of processing which is carried out by a robot control device of FIG. 1.

FIG. 2 is a flow chart which shows an example of processing which is carried out by the robot control device 13, in particular processing relating to article take-out. Below, the operation by the article take-out apparatus 10 will be explained with reference to the flow chart of FIG. 2 and the related drawings.

Figure 3:
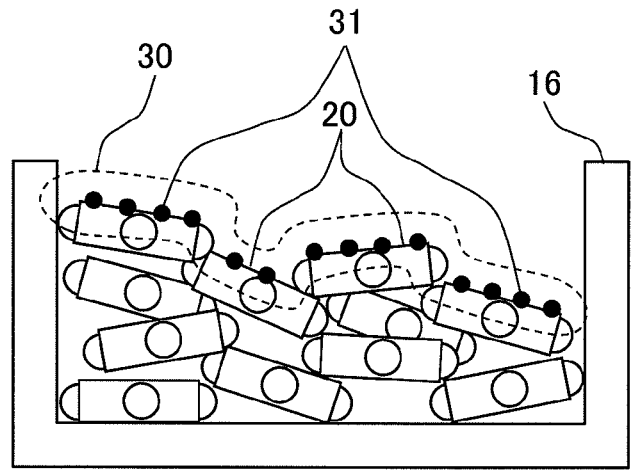
FIG. 3 is a view which shows an example of a 3D point set acquired by the 3D measuring device of FIG. 1.

The processing of FIG. 2 is for example started by operation of a not shown operation switch to input a take-out start command of an article 20. First, the surfaces of the plurality of articles 20 which are stored in bulk in the 3D space are measured by the 3D measuring device 11 to acquire the 3D point set 30 (step S1). FIG. 3 is a view which shows an example of the 3D point set 30 acquired by the 3D measuring device 11 and the 3D points 31 forming the 3D point set 30. In the figure, the 3D points 31 are shown by black dots, while the 3D point set 30 is shown as the region surrounded by a broken line including the black dots as a whole.

Figure 4:
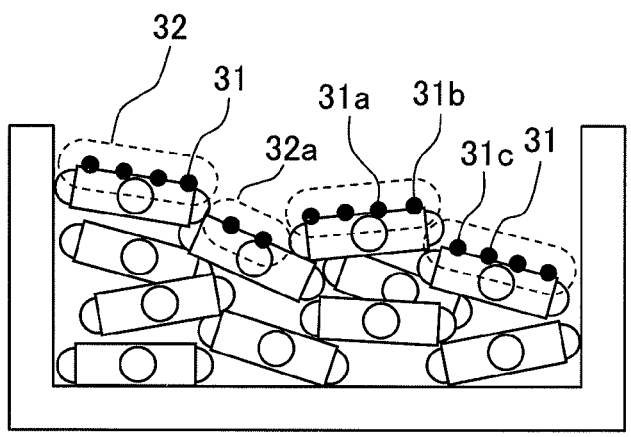
FIG. 4 is a view which shows an example of connected sets determined from the 3D point set of FIG. 3.

Next, one or more connected sets 32 are determined from the 3D point set 30 (step S2). FIG. 4 is a view which shows an example of connected sets 32 determined from the 3D point set 30. In the figure, the connected sets 32 are shown as regions which are surrounded by broken lines. That is, FIG. 4 shows four connected sets 32.

Figure 15:
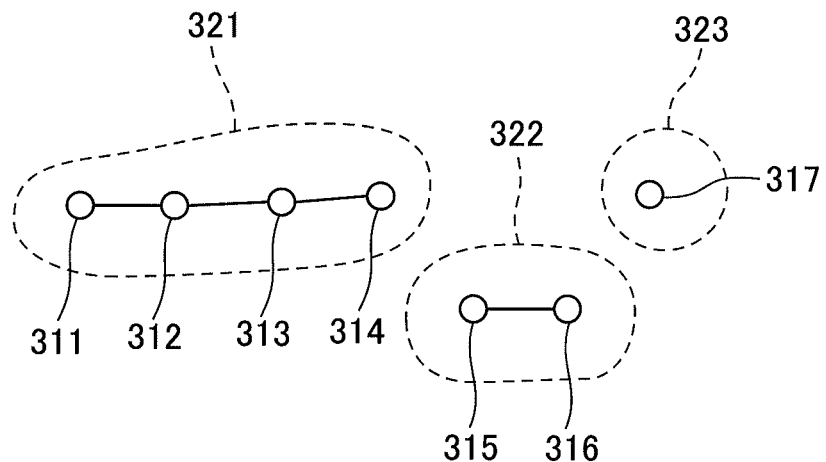
FIG. 15 is a conceptual view which explains the connected sets.

A "connected set 32" referred to here is a subset of the 3D point set 30. When, near a 3D point (first 3D point) 31, there is another 3D point (second 3D point) 31 different from that 3D point 31, the connected set is made by connecting the first 3D point 31 and the second 3D point 31. For example, as shown in FIG. 15, when a plurality of 3D points 31 (shown by 311 to 317) are measured and the measured 311 and 312, 312 and 313, 313 and 314, and 315 and 316 are present within a predetermined distance, these are mutually connected with each other. In this case, 311 and 314 are also connected through 312 and 313, so 311 to 314 form the same connected set 321. On the other hand, 315 and 316 are not connected with any of 311 to 314, so form another connected set 322. 317 is not connected with any of 311 to 316, so 317 alone forms a connected set 323. That is, a "connected set 32" is a set of 3D points made by connecting 3D points which are close to each other.

Figure 14:
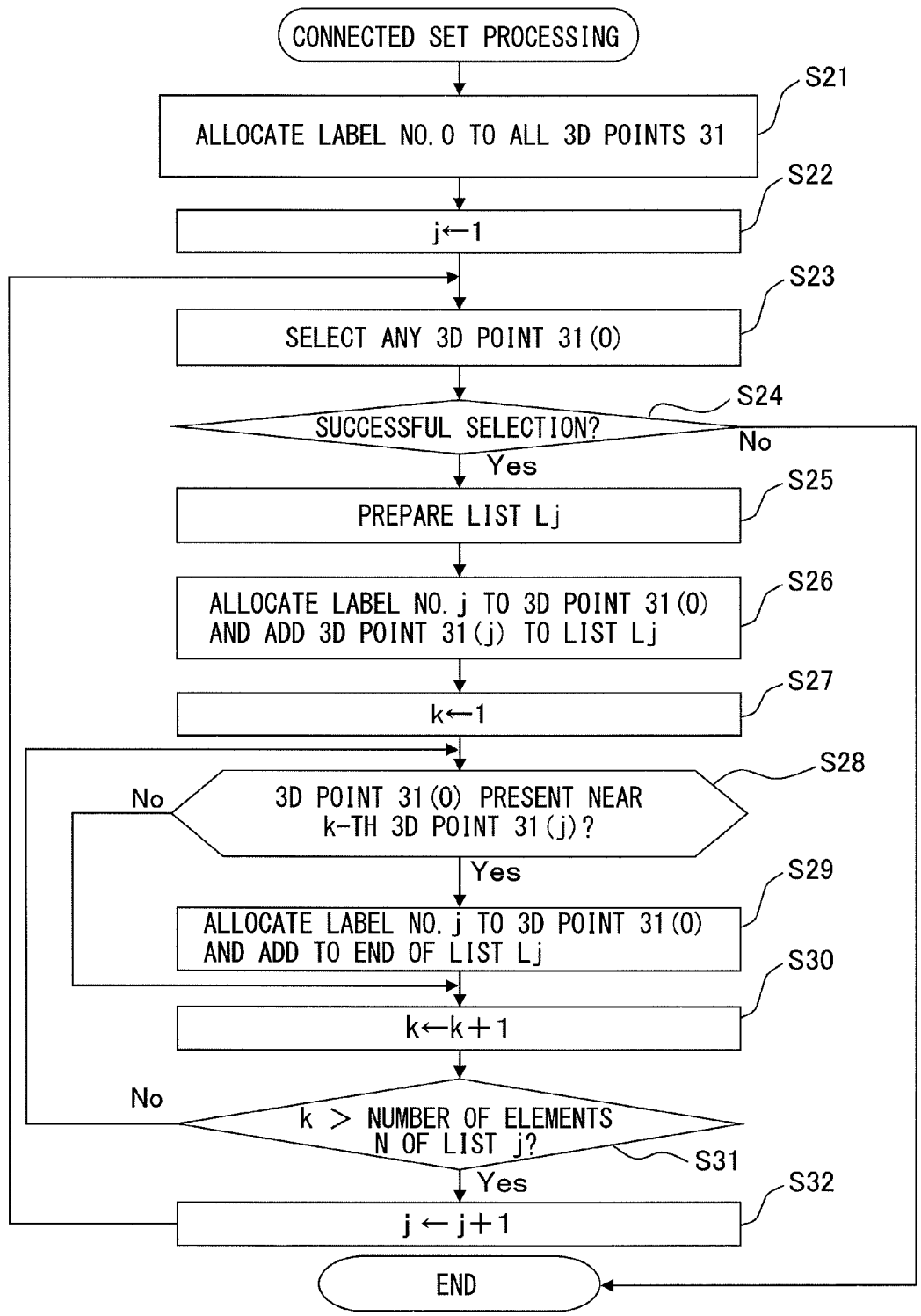
FIG. 14 is a flow chart which shows an example of processing for determining connected sets of FIG. 2.

When the 3D measuring device 11 is used to measure flat surfaces of articles 20 stored in bulk, adjoining 3D points 31 on the same article 20 (for example, 31a and 31b of FIG. 4) are positioned at a close distance to each other. As opposed to this, at the boundary parts of articles 20, the positions of the adjoining 3D points (for example, 31b and 31c of FIG. 4) greatly change. Therefore, while the 3D points 31a and 31b belong to the same connected set 32, the 3D points 31b and 31c belong to mutually different connected sets 32, so the connected sets 32 can be used to identify articles 20. The specific processing for determining the connected sets 32 will be explained later (FIG. 14).

Next, the positions of the 3D points 31 which belong to the same connected sets 32 are used as the basis to determine representative positions and postures (i.e., "representative position-posture") 33 which represent the connected sets 32 (step S3). The connected sets 32 identify the exposed surfaces of the articles 20, so the representative positions and postures 33 become positions and postures which represent the articles 20. That is, step S3 indicates processing which uses the connected sets 32 to identify the positions and postures of the articles 20. Due to this, it is possible to recognize the positions and postures of the articles 20. The positions and postures of the articles 20 are identified based on the position information of the 3D points 31 which are acquired by the 3D measuring device 11. That is, they are determined by calculation based on the 3D points 31 which are obtained by measurement of exposed parts of the articles 20. For this reason, even if the arrangements of the articles 20 do not change, when the exposed states differ, the identified positions and postures of the articles 20 will differ. That is, the positions and postures of articles 20 are not identified unambiguously in accordance with the arrangement of the articles 20, but are identified in accordance with the exposed states of the surfaces of the articles 20.

Figure 5:
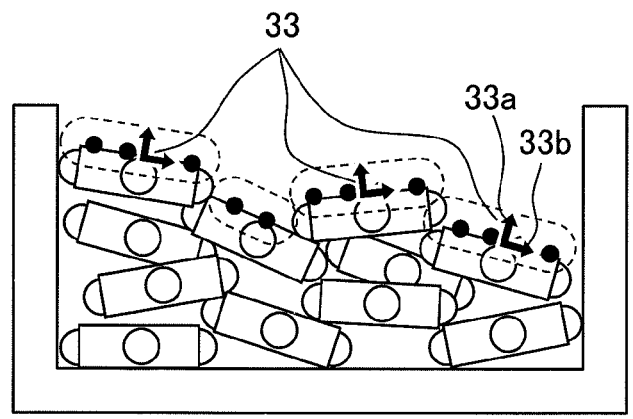
FIG. 5 is a view which shows an example of representative positions and postures based on positions of 3D points belonging to various connected sets of FIG. 4.

FIG. 5 is a view which shows an example of the representative positions and postures 33 which are calculated based on the positions of the 3D points 31 belonging to the connected sets 32. The representative positions and postures 33 are shown by the pairs of arrows 33a and 33b which perpendicularly intersect each other. This is because the representative positions and postures 33 are expressed by the Cartesian coordinate system. In FIG. 5, the representative positions and postures 33 are shown by the two arrows 33a and 33b. However, the representative positions and postures 33 are not in a 2D space, but are in a 3D space.

There are several methods for determining the representative positions and postures 33. First, as a first example, there is the method of combining the center of gravity positions of the 3D points 31 which belong to the connected sets 32 and predetermined postures (for example, postures where the arrows 33a are directed in the vertical direction upward) to obtain the representative positions and postures 33. The center of gravity positions may be calculated by utilizing all of the 3D points 31 belonging to the connected sets 32 or may utilize 3D points 31 which are selected by separately introducing processing for dealing with deviating values, etc. As means for dealing with deviating values, for example, first all 3D points 31 which belong to the connected sets 32 are utilized for calculation of the centers of gravity to determine the center of gravity positions. When there are 3D points 31 utilized for calculation of the centers of gravity which have distances from the center of gravity positions of a predetermined distance or more, a predetermined ratio of 3D points 31 are removed in order from the greatest distance of the 3D points 31 utilized for calculation of the centers of gravity. The remaining 3D points 31 are utilized for calculation of the centers of gravity to recalculate the center of gravity positions. This processing should be repeated until all of the 3D points 31 utilized for calculation of the centers of gravity fall within a predetermined distance from the center of gravity positions.

As a second example, there is the method of determining flat surfaces based on the positions of the 3D points 31 which belong to the connected sets 32, and combining the positions of single points on those flat surfaces (for example, points forming the centers of gravity) and the postures based on the normal direction of that flat surfaces to obtain the representative positions and postures 33. The flat surfaces may be determined by the least square method using all 3D points 31 which belong to the connected sets 32 or may be determined by separately introducing some sort of processing for dealing with deviating values. As methods for dealing with deviating values, there are the M estimation method, RANSAC, LMedS, Hough transform, and several other methods. By using a Hough transform or other processing, even if connected sets 32 span the surfaces of a plurality of articles 20, it becomes possible to extract and recognize single flat surfaces from among them.

When a connected set 32 spans the surfaces of a plurality of articles 20, this is because the 3D points 31 at the boundary parts of the articles 20 (for example, 31b and 31c in FIG. 4) are positioned at a close distance from each other. In this case, the 3D points 31b and 31c belong to the same connected set 32. if applying a Hough transform to judge if the plurality of 3D points 31 in a connected set 32 are on the same flat surface and it is judged that they are on mutually different flat surfaces, it is also possible to divide the connected set 32 into connected sets corresponding to the different flat surfaces (for example, a connected set 32 including the 3D point 31b and a connected set 32 including the 3D point 31c). Due to this, the connected sets 32 are revised, so the connected sets 32 can be determined more precisely for individual articles 20.

As a third example, there is the method of determining curved surfaces based on the positions of the 3D points 31 which belong to the connected sets 32, and combining the positions of single points on those curved surfaces (for example, points on the curved surfaces closest to the centers of gravity) and the postures based on the normal directions of the curved surfaces at those positions to obtain the representative positions and postures 33. The curved surfaces may be determined by the least square method using all 3D points 31 which belong to the connected sets 32 or may be determined by separately introducing some sort of processing for dealing with deviating values. As methods for dealing with deviating values, there are the M estimation method, RANSAC, LMedS, Hough transform, and several other methods. By using a Hough transform or other processing, even if connected sets 32 span the surfaces of a plurality of articles 20, it becomes possible to extract and recognize single curved surfaces from among them.

As a fourth example, there is the method of determining holes based on the positions of the 3D points 31 which belong to the connected sets 32, and using the positions and postures of the holes (directions in which holes are made) as the representative positions and postures 33. This method is effective when the articles 20 are provided with holes. If showing one example, first, it is judged if there is a closed region of a predetermined area or more where there are no 3D points 31 in a connected set 32 (3D point-free region). If it is judged that there is a 3D point-free region, it is assumed that the 3D point-free region is a hole. Next, the center of gravity position of the 3D points 31 at the edges of the hole is determined and this is used as the position of the hole. Furthermore, the positions of the 3D points at the edges of the hole are used as the basis to find a flat surface, and the posture based on the normal direction of that flat surface is used as the posture of the hole.

FIG. 5 shows the case of determining the representative positions and postures 33 by the second example in the above four examples. At step S3, the areas of regions where the 3D points 31 belonging to the connected sets 32 are present are processed, and the representative position and posture 33 are not obtained from a connected set 32 (32a in FIG. 4) with an area of less than a predetermined value. That is, the representative positions and postures 33 are determined only for connected sets 32 for which it is judged that the surfaces are sufficiently exposed. A connected set 32a for which the representative position and posture 33 are not determined is not considered for takeout of articles. Due to this, it is possible to prevent the hand 14 from approaching the article 20 which is expressed by the connected set 32a, that is, the article 20 at the deep part where part of the surface is covered by other articles 20, and possible to keep the hand 14 from striking articles 20 other than those considered for takeout.

Figure 6:
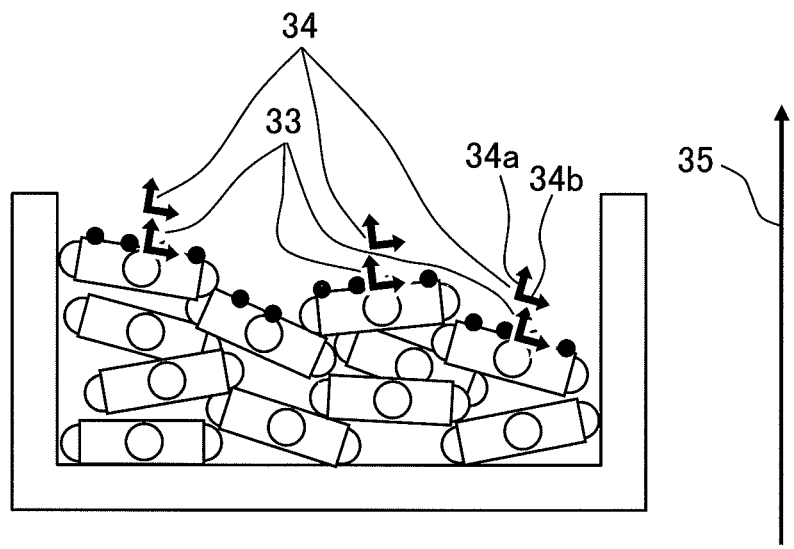
FIG. 6 is a view which shows an example of hand positions and postures corresponding to the representative positions and postures of FIG. 5.

Next, the hand positions and postures (i.e., "hand position-posture") 34 which correspond to the individual representative positions and postures 33 are determined (step S4). FIG. 6 is a view which shows an example of the hand positions and postures 34 which correspond to the representative positions and postures 33. The hand positions and postures 34 are shown by the pairs of arrows 34a and 34b intersecting at right angles in the same way as the representative positions and postures 33.

There are several methods for determining the positions (intersections of arrows 34a and 34b) and the postures (directions of arrows 34a and 34b) of the hand positions and postures 34. Regarding the positions, for example, there is the method of making directly the positions of the representative positions and postures 33 as the positions of the hand positions and postures 34. As another example, there is the method of making positions moved by predetermined lengths from the positions of the representative positions and postures 34 along the direction of a predetermined coordinate axis 35 (for example, the Z-axis) as the positions of the hand positions and postures 34. FIG. 6 shows the positions in the latter example. Regarding the posture, for example, there is the method of making directly the postures of the representative positions and postures 33 as the postures of the hand positions and postures 34. As another example, when the positions of the representative positions and postures 33 are close to the walls of the container 16, there is the method of inclining the hand 14 in a direction away from the walls for the purpose of avoiding collision between the walls and the hand 14. FIG. 6 shows the postures in the former example.

Figure 7:
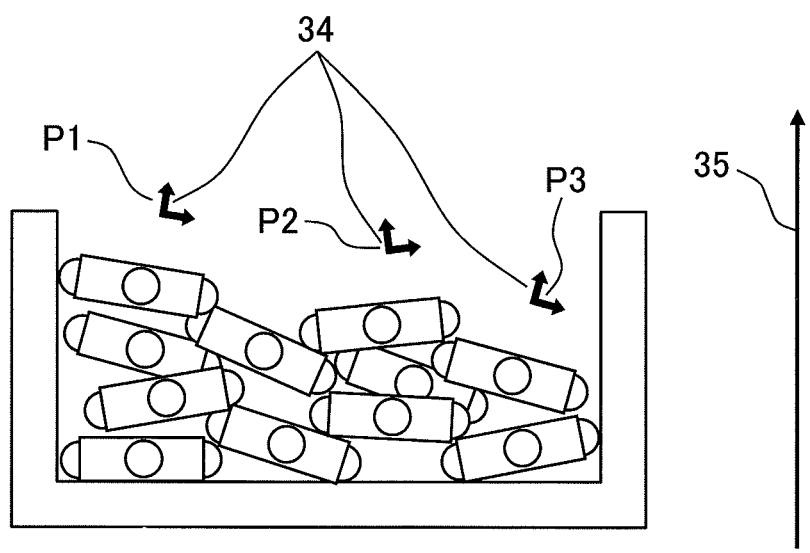
FIG. 7 is a view which shows an example of numbering of hand positions and postures of FIG. 6.

Next, the individual hand positions and postures 34 are numbered as P1, P2, . . . , Pn (step S5), where "n" is the number of the hand positions and postures 34. FIG. 7 is a view which shows the numbered hand positions and postures 34. These are numbered in descending order of coordinate values with respect to a predetermined coordinate axis 35, that is, in order from the ones at the highest position. FIG. 7 shows an example where n=3.

Figure 8:
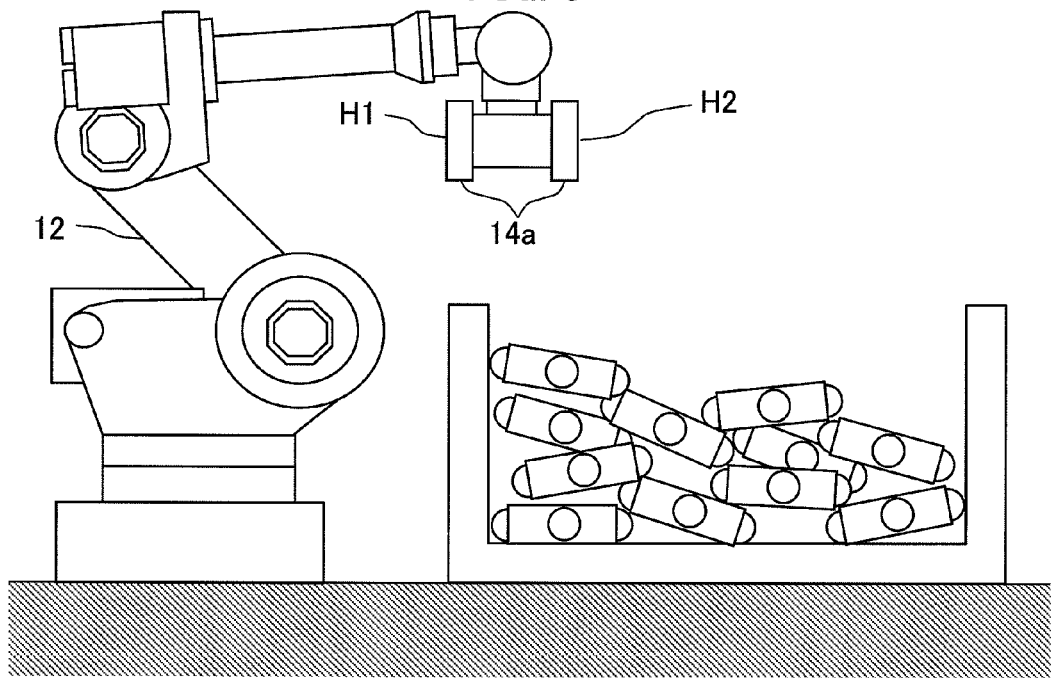
FIG. 8 is a view which shows an example of numbering of holders of a hand configuring part of the article take-out apparatus of FIG. 1.

Next, the holders 14a of the hand 14 are numbered as H1, H2, . . . , Hm (step S6), where "m" is the number of the holders 14a. FIG. 8 shows the numbered holders 14a. FIG. 8 shows an example where m=2.

Next, the variables "j" and "k" taking values of natural numbers are initialized. That is, 1 is entered for "j" (j←1) and 1 is entered for "k" (k←1) (step S7). The variable "j" is used for designating the ordinal numbers of the holders 14a, while the variable "k" is used for designating the ordinal number of the hand positions and postures 34. Below, a holder 14a corresponding to the variable "j" is expressed as "Hj" and a hand position and posture 34 corresponding to the variable "k" are expressed as "Pk".

Figure 9:
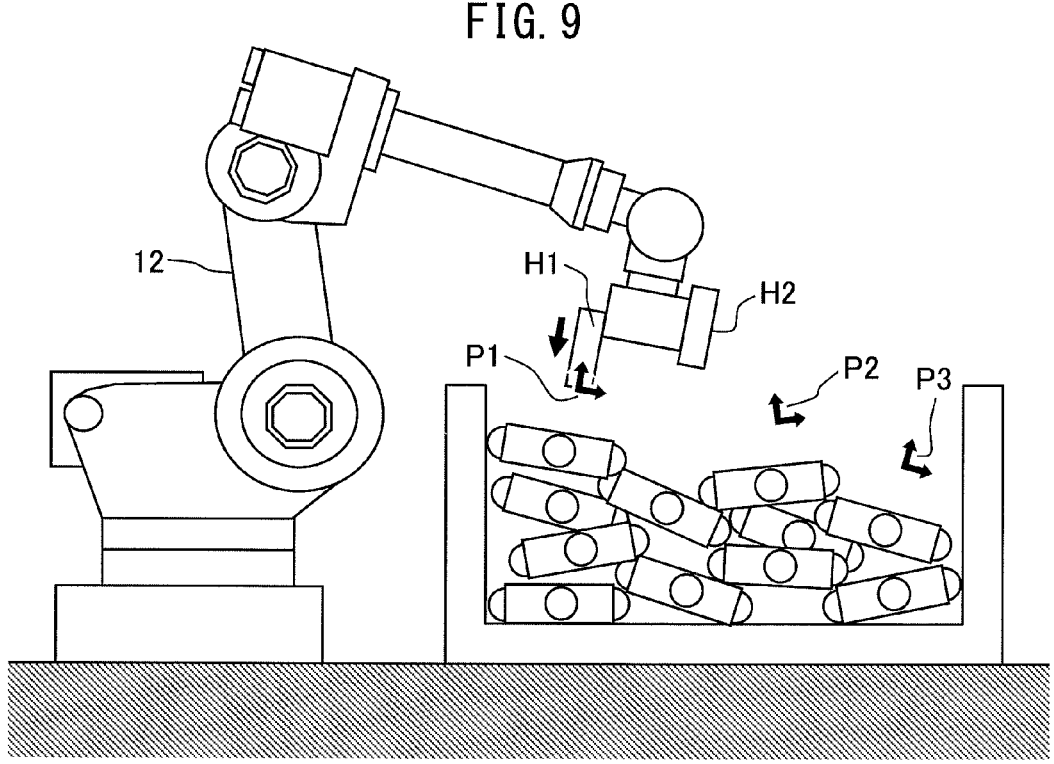
FIG. 9 is a view which shows an example of the operation of an article take-out apparatus according to an embodiment of the present invention.

Next, as shown in FIG. 9, a control signal is output to an actuator for driving a holder Hj (electric motor or cylinder) to lower the holder Hj, while a control signal is output to an actuator for driving the robot (electric motor) so as to operate the robot 12 to move the holder Hj to a hand position and posture Pk (step S8). For the initial values j=1 and k=1 of the variables, Hj=H1 and Pk=P1.

Figure 10:
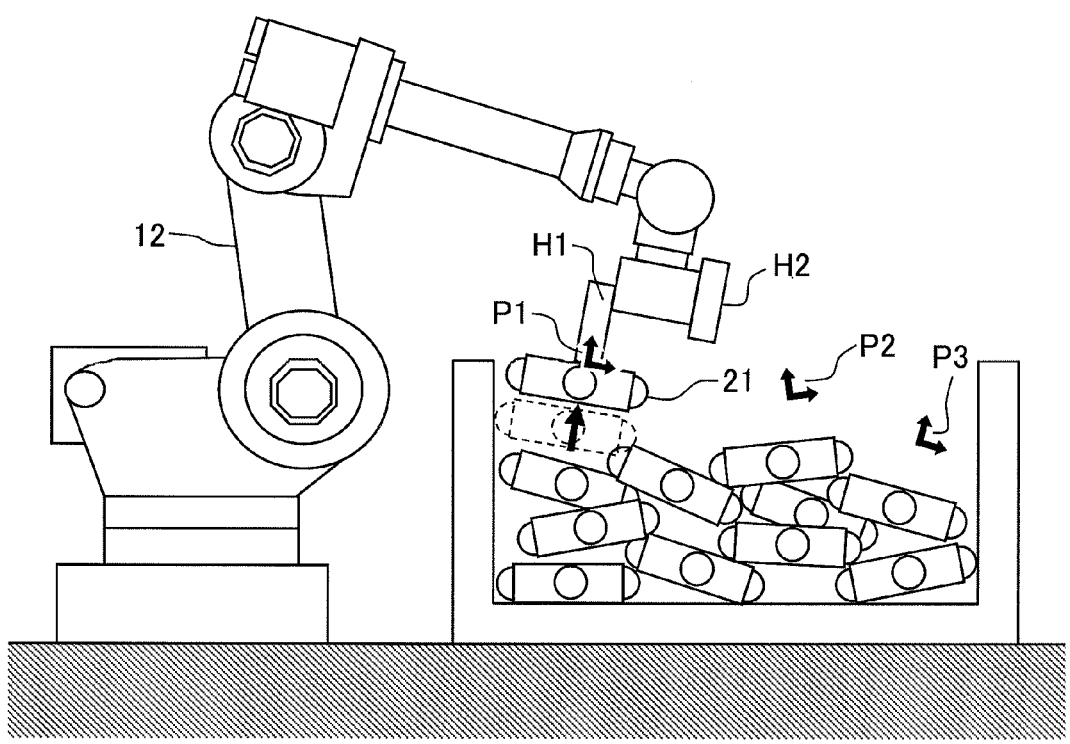
FIG. 10 is a view which shows an example of the operation after FIG. 9.

Next, a control signal for holding an article 20 is output to the actuator for driving the holder Hj whereby, as shown in FIG. 10, the bottom end face of the holder Hj holds the article 20 (held article 21) (step S9). For example, when the holder Hj has a suction nozzle, a vacuum pump is actuated and the suction force is used to pick up and hold the held article 21. Further, when the holder Hj has a pickup magnet, current is run through an electromagnet coil to energize the magnet and the magnetic force is used to pick up and hold the held article 21. If the holder Hj is a chuck, the chuck is opened or closed to hold the held article 21.

Figure 11:
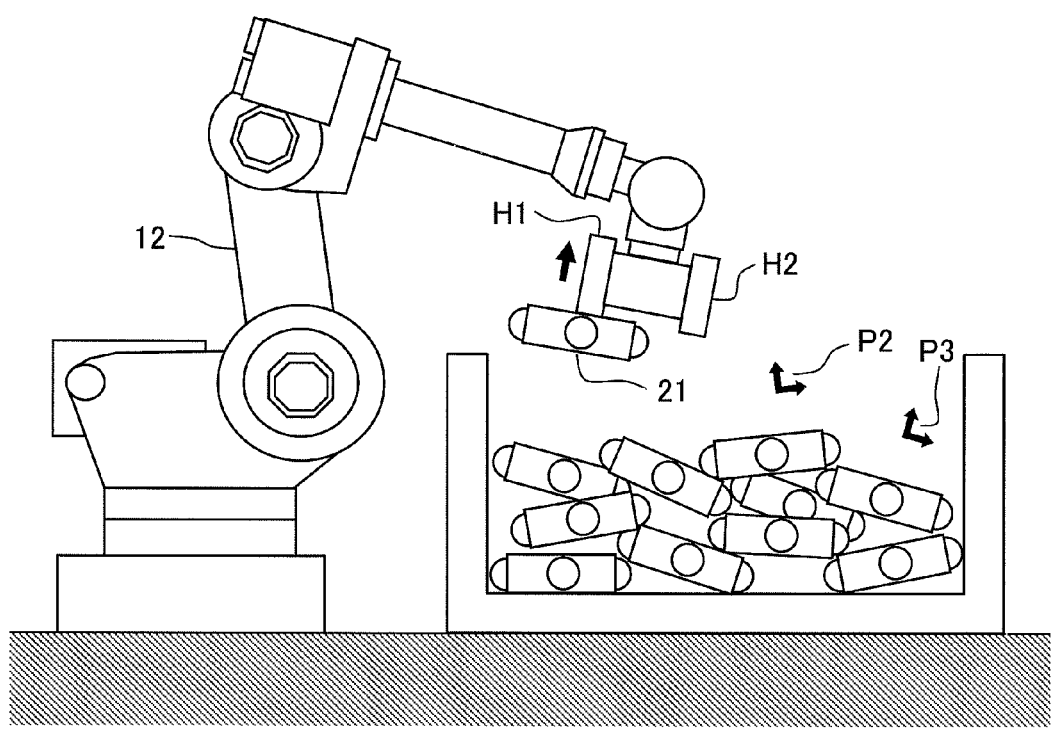
FIG. 11 is a view which shows an example of the operation after FIG. 10.

Next, as shown in FIG. 11, a control signal is output to the actuator for driving the holder Hj to rise the holder Hj which holds the held article 21 (step S10). By rising the holder Hj, when operating the robot 12 to move the hand 14, it is possible to avoid collision between the held article 21 or holder Hj and another article 20.

Next, it is judged if the holder Hj has succeeded in holding the held article 21 (step S11). For example, when the holder Hj has a suction nozzle, it is sufficient to use a change in a flow rate or pressure of the air at the time of suction so as to judge if the holding operation has been successful. Further, when the holder Hj has a pickup magnet, it is sufficient to judge by a proximity sensor if there is a held article 21 and to judge if the holding operation has been successful in accordance with its existence. When the holder Hj has a chuck, it is sufficient to confirm the opened and closed state of the chuck by an opening and closing confirmation sensor and judge if the holding operation has been successful. If it is judged that the holding operation has been successful, the routine proceeds to step S12. If it is judged if the holding operation has not be successful, the routine proceeds to step S14.

At step S12, it is judged if j<m is satisfied. This judgment is judgment as to whether there is a holder which still does not hold a held article 21 among the "m" number of holders Hj (in FIG. 11, two). When it is judged that j<m is satisfied, the holder Hj+1 still does not hold a held article 21, so "j" is incremented by 1 to make j←j+1 (step S13) and the routine proceeds to step S14. When it is judged that j<m is not satisfied, all holders Hj hold held articles 21, so the routine proceeds to step S16.

Figure 12:
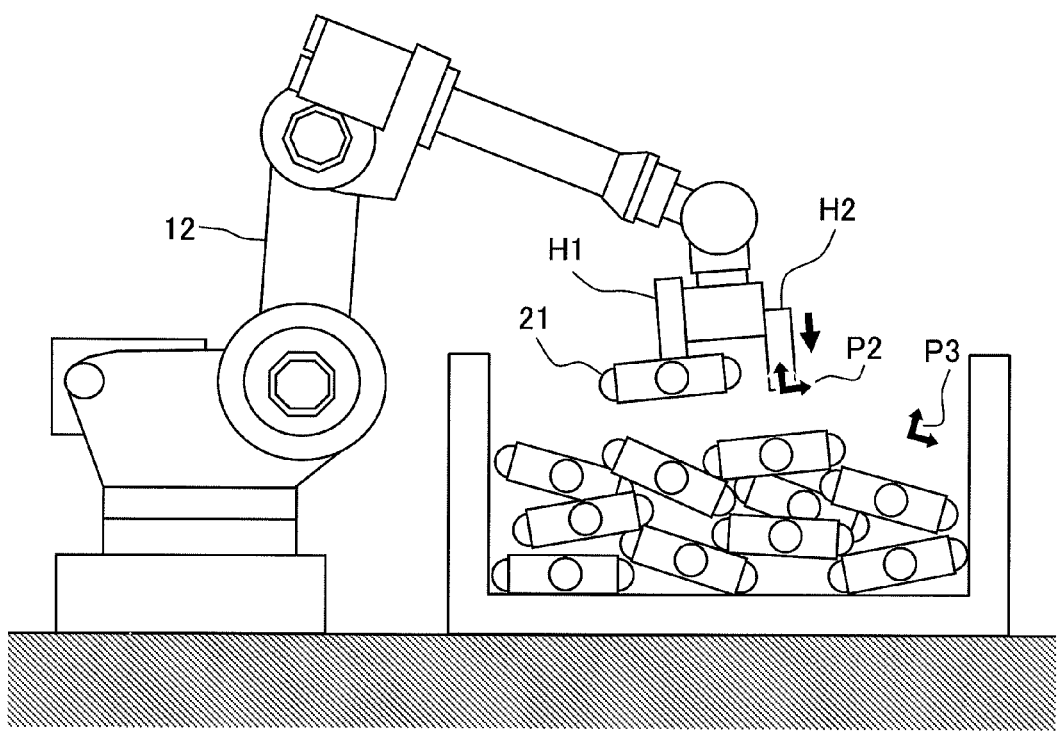
FIG. 12 is a view which shows an example of the operation after FIG. 11.
Figure 13:
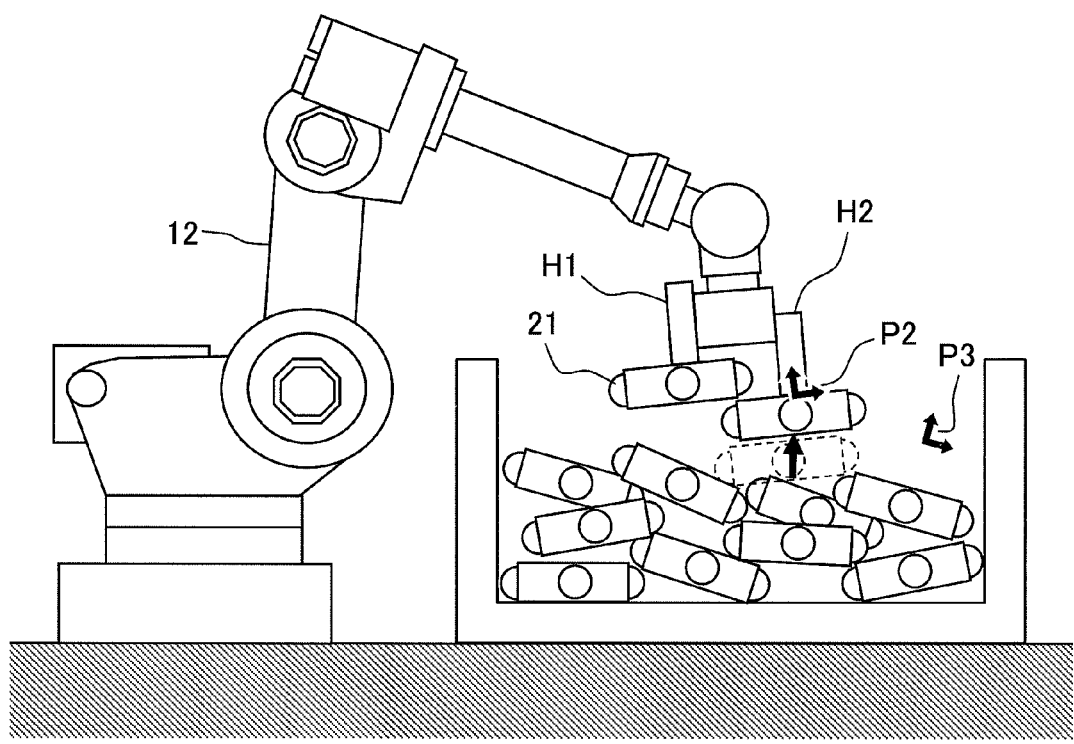
FIG. 13 is a view which shows an example of the operation after FIG. 12.

At step S14, it is judged if k<n is satisfied. This judgment is judgment as to whether the holders Hj have not yet reached some of the "n" number (in FIG. 11, three) of hand positions and postures 34. When it is judged that k<n is satisfied, a holder Hj has still not reached the hand position and posture Pk+1, so "k" is incremented by 1 to make k←k+1 (step S15) and the routine returns to step S8. Further, as shown in FIG. 12, the next holder Hj is moved to the next hand position and posture Pk by operation of the robot 12 while lowering it. FIG. 12 shows an example where Hj=H2 and Pk=P2. Next, a control signal for attraction of an article is output to this holder Hj and, as shown in FIG. 13, the next held article 21 is held (step S9). When k<n is not satisfied at step S14, the holders Hj have reached all of the "n" number of hand positions and postures 34, so the routine proceeds to step S16.

At step S16, a control signal is output to the actuator for driving the robot, and the hand 14 is moved to a predetermined position. Due to this, the held article 21 is conveyed by operation of the robot 12 to a predetermined position. After this, a control signal is output to the actuator for driving the holder Hj and the held article 21 is detached from the holder Hj. With the above, one cycle of processing is ended. When despite there being unreached hand positions and postures 34 (k<n), all of the holders Hj are holding held articles 21 (j≥m), at step S16, the held articles 21 are conveyed to the predetermined positions and detached from the holders Hj, then the number "j" of the holder Hj is set to the initial value 1, and the processing after step S8 is repeated.

Here, the processing for determining the connected sets 32, that is, the specific processing of step S2 of FIG. 2, will be explained. FIG. 14 is a flow chart which shows an example of the processing for determining the connected sets 32 (connected set processing).

First, at step S21, all 3D points 31 which belong to a 3D point set 30 are allocated initial label numbers of the "Label No. 0" expressing that they do not belong to any connected sets 32. Below, a 3D point 31 to which the natural number "Label No. j" is allocated is expressed as "31(j)". The "Label No. j" is an ordinal number which is allocated corresponding to the connected set 32. If the same "Label No. j", not 0, is allocated, it means the 3D points belong to the same connected set 32. Next, at step S22, the "Label No. j" is set to 1 (j←1) so as to determine the first connected set 32.

Next, at step S23, any 3D point 31 which belongs to the 3D point set 30 with a Label No. 0, that is, a 3D point 31(0), is selected. At step S24, it is judged if a 3D point 31(0) of "Label No. 0" has been selected. If the judgment is YES, the routine proceeds to step S25. If a 3D point 31(0) is not selected, all of the 3D points 31 which belong to the 3D point set 30 belong to some connected set 32 or another. In this case, the judgment at step S24 is NO, the connected set processing is ended, and the routine proceeds to step S3 of FIG. 2.

At step S25, a List Lj for storing the 3D points 31(j) of "Label No. j" is prepared. At step S26, the 3D point 31(0) selected at step S24 is allocated the "Label No. j", then the 3D point 31(j) is added to the List Lj. At step S27, the variable "k" taking a natural number is given the initial value 1 (k←1). Here, "k" is an ordinal number which designates a 3D point 31(j) included in the List Lj. In the List Lj, the added 3D point 31(j) is arranged in the added order.

At step S28, it is judged if there is a 3D point 31(0) of "Label No. 0" near the k-th 3D point 31(j) of the List Lj. If the judgment at step S28 is YES, the routine proceeds to step S29, while if it is NO, the routine bypasses step S29 and proceeds to step S30. At step S29, all 3D points 31(0) which are judged present near the k-th 3D point 31(j) of the List Lj are allocated the "Label No. j", then these 3D points 31(j) are added to the end of the List Lj. At step S30, "1" is added to the variable "k" (k←k+1).

At step S31, it is judged if the value of "k" is larger than the number of 3D points 31(j) which are stored on the List Lj (number of elements N). If "k" is larger than the number of elements N, the processing for judgment of proximity is ended for all of the N number of 3D points 31(j) which are stored on the List Lj. The 3D points which are near the 3D points 31(j) on the List Lj are already stored on the same List Lj. For this reason, the processing for adding the 3D points 31(j) to the List Lj is ended, and the routine proceeds to step S32. In other cases, the processing for judging proximity is not ended for all of the 3D points 31(j) in the List Lj, so the routine returns to step S28 where processing for adding the 3D points 31(j) to the List Lj is repeated.

At step S32, the "Label No. j" is incremented by "1" (j←j+1) and the routine returns to step S23. After this, the processing of the same as step S23 to step S32 is repeated to determine the connected set 32 corresponding to the next "Label No. j."

The above connected set processing will be explained specifically while referring to FIG. 15. At the time of start of the connected set processing, none of the 3D points 311 to 317 belong to the connected sets 32. The label numbers of the 3D points 311 to 317 are "0" (step S21). From this state, if for example selecting the 3D point 313 to prepare the connected set 32 of "Label No. 1" (step S23), the 3D point 313 is allocated the "Label No. 1" (313(1)), then the 3D point 313 is stored at the 1st position at the List L1 of the "Label No. 1" (step S26).

Next, it is judged if there is a 3D point 31(0) of "Label No. 0" near the 1st 3D point 313 of the List L1 (step S28). In this case, since there are 3D points 312 and 314 of "Label No. 0", these 3D points 312 and 314 are allocated the "Label No. 1" (312(1), 314(1)) and are added to the 2nd and 3rd positions of the List L1 (step S29). Due to this, the number of elements N of the List L1 becomes 3.

After this, "k" becomes 2(<N) (step S30), then it is judged if there is a 3D point 31(0) of "Label No. 0" near the second 3D point 312 of the List L1 (step S28). In this case, since there is a 3D point 311 of "Label No. 0", this 3D point 311 is allocated the "Label No. 1" (311(1)), and this is added to the 4th position of the List L1 (step S29). Due to this, the number of elements N of the List L1 becomes 4.

After this, "k" becomes 3(<N) (step S30), then it is judged if there is a 3D point 31 of "Label No. 0" near the third 3D point 314 of the List L1 (step S28). In this case, there is no 3D point 31 of "Label No. 0" near the 3D point 314, so the number of elements N remains 4 and "k" becomes 4 (step S30), then it is judged if there is a 3D point 31(0) of "Label No. 0" near the fourth 3D point 311 of the List L1 (step S28). In this case, there is no 3D point 31 of "Label No. 0" near the 3D point 311, so the number of elements N remains 4 and "k" becomes 5 (step S30).

At this time, "k" becomes larger than the number of elements N, so the List L1 of the "Label No. 1" finishes being prepared, the label number is set to "2" (step S32), and similar processing is repeated. In the repeated processing, for example, the 3D points 315 and 316 of "Label No. 0" are allocated the "Label No. 2", and the 3D points 315(2) and 316(2) are added to the List L2, while the 3D point 317 of "Label No. 0" is allocated the "Label No. 3", and the 3D point 317(3) is added to the List L3. Due to this, since there is no 3D point 31 of "Label No. 0", the judgment at step S24 is NO and the connected set processing is ended.

In the above processing, when determining the connected sets 32, processing inside of the robot control device 13 which has the function of a proximity judging unit is used to judge whether there is another 3D point 31 near a 3D point 31 (step S28). The proximity judging unit, for example, may set a predetermined distance "a" corresponding to the XYZ 3D coordinate system in advance and may judge that there is a second 3D point 312 near a first 3D point 311 which belong to the 3D point set 30 when the distance D between the first 3D point 31 (for example, 311 of FIG. 15) and the second 3D point 31 (for example, 312 of FIG. 15) is within a predetermined distance "a". Predetermined distances xya and za may be set for the XY 2D coordinate system and the Z 1D coordinate system, not the XYZ 3D coordinate system, the distances Dxy and Dz between the 3D points 311 and 312 may be determined for the XY 2D coordinate system and the Z 1D coordinate system, and it may be judged that there is a second 3D point 312 near the first 3D point 311 when these distances Dxy and Dz are within preset predetermined values xya and za.

When the 3D point set 30 is expressed in the form of a distance image and the pixels of the distance image are arranged at equal intervals vertically and horizontally, the proximity judging unit may judge the proximity of 3D points, for example, in the following way. That is, a 1D coordinate system serving as a yardstick for the brightnesses of the pixels of the distance image is defined, while a threshold value which expresses the difference of brightnesses corresponding to a predetermined distance is defined for the 1D coordinate system. The first 3D point and the second 3D point are pixels adjoining each other on the distance image. When the difference of brightnesses between the corresponding pixels is within a threshold value, it may be judged that there is a second 3D point near the first 3D point.

According to the present embodiment, the following functions and effects can be exhibited:

(1) The method includes measuring surface positions of a plurality of articles 20 stored in bulk in a 3D space by a 3D measuring device 11 to acquire position information of a plurality of 3D points 31. Further, it uses processing at the robot control device 13 to determine connected sets 32 made by connecting 3D points 31 which are close to each other from the 3D point set 30 (step S2), to determine the positions and postures (hand positions and postures 34) of the hand 14 (holder 14a) which can take out articles 20 (step S3 to step S4) based on the position information of the 3D points 31 belonging to the connected sets 32, and to control the robot 12 to move the hand 14 to determined hand positions and postures 34 to take out articles 21 from the container (step S8 to step S10).

The thus determined connected sets 32 reflect the positions and postures (inclinations) of the surfaces of articles which are exposed facing the 3D measuring device 11, and enable identification of the positions and postures of the articles 20 without relying on pattern matching, etc. For this reason, there is no need to prepare a model pattern of the article 20. Even with a large number of types of articles or irregularly shaped articles 20, it is possible to easily recognize their positions and postures and hold the articles 20. Further, even with an added new type of articles 20, it is possible to recognize their positions and postures without adding a model pattern and possible to avoid failure of recognition or mistaken recognition of the positions and postures of articles 20 or failure of take-out or collision of articles 20 and other problems. As a result, it is possible to move the hand 14 at a high speed to easily accessible articles 20 at the top and efficiently take out the articles 20.

As opposed to this, for example, with the method of using a 2D model pattern of an article and using pattern matching to recognize the position of such articles (method according to a first comparative example), it is necessary to prepare a 2D model pattern, and therefore troublesome work is required. In particular, when there are a large number of types of articles, it is necessary to prepare that number's worth of model patterns and, therefore tremendous work is required. Furthermore, in the method by the first comparative example, there is the following problem when compared with the present embodiment. Articles 20 which are stored in bulk take various postures. If carrying out 2D pattern matching corresponding to the different postures, for example, it is necessary to utilize converted 2D model patterns obtained by application of 2D geometric conversion. However, this method can only be used for flat articles. If trying to apply 2D pattern matching to a usual 3D article, considering the numerous different ways of viewing it, which cannot be made up for by geometric conversion, it becomes necessary to prepare 2D model patterns from several directions such as the front, back, sides, and a slant even for just a single type of article. Furthermore, if considering how to deal with a large number of types of articles, it becomes necessary to prepare an enormous number of 2D model patterns resulting from multiplication of the number of types of articles and tremendous work is required. Further, in the case of irregularly shaped articles, 2D model patterns cannot be prepared, so their positions cannot be recognized. Bulk stored articles 20 suffer from poor lighting, shadows from other articles 20, unforeseen slanting of the articles 20, and other poor photographing conditions. Therefore, there is a risk of failure of recognition or mistaken recognition of the positions and postures of articles 20, failure to recognize the positions of articles to be taken out which are positioned at the top, and premature recognition of the positions of articles at the bottom. If controlling the position and posture of the hand 14 of the robot 12 while aiming at a mistakenly recognized position and posture of an article or the position of an article at the bottom, the article 20 will fail to be taken out and the work efficiency of the apparatus will fall. Not only that, the hand 14 and article 20 are liable to collide and damage themselves. If trying to avoid damage, it is necessary to slow the speed of movement of the robot 12 and therefore the work efficiency deteriorates.

Further, for example, with the method of using a 3D model pattern of an article and using 3D pattern matching to recognize the position of such articles (method based on a second comparative example) as well, a 3D model pattern has to be prepared and troublesome work is required. In particular, when there are a large number of types of articles, it is necessary to prepare that number's worth of model patterns and tremendous work is required. Furthermore, the method according to the second comparative example has the following problem when compared with the present embodiment. With irregularly shaped articles, 3D model patterns cannot be prepared, so the positions cannot be recognized. Bulk stored articles do not enable 3D points to be acquired at the sides not facing the 3D measuring device. In addition, they greatly slant or are blocked by nearby articles resulting in poor photographing conditions. For this reason, it is difficult to obtain a 3D point set sufficient in both quantity and quality to enable determination of the 3D posture of articles by 3D pattern matching. Therefore, there is a risk of failure of recognition or mistaken recognition of the positions and postures of articles, failure to recognize the positions of key articles at the top, and premature recognition of the positions of articles at the bottom. If controlling the position and posture of the hand 14 of the robot 12 while aiming at a mistakenly recognized position and posture of an article or the position of an article at the bottom, the article 20 will fail to be taken out and the work efficiency of the apparatus will fall. Not only that, the hand 14 and article 20 are liable to collide and damage themselves. If trying to avoid damage, it is necessary to slow the speed of movement of the robot 12 and therefore the work efficiency deteriorates.

(2) Due to the processing at the robot control device 13, it is judged if the distance D according to a predetermined coordinate system (for example, XYZ coordinate system) between any 3D point 31 (first 3D point) and another 3D point 31 (second 3D point) belonging to the 3D point set 30 is within a preset predetermined distance "a". If it is judged that it is within the predetermined distance "a", the first 3D point 31 and the second 3D point 31 are allocated the same "Label No. j" and are connected (step S28 and step S29). Therefore, it is possible to easily and precisely prepare connected sets 32 which express positions and postures of the surfaces of the articles 20. Further, compared with the technique of dividing the 3D point set 30 into sub-regions which are surrounded by edges which are extracted from the 3D point set 30, even if there is a defect in the data of the 3D point set 30, it is possible to stably recognize positions and postures of the surfaces enabling articles 20 to be held.

(3) Due to the processing at the robot control device 13, the positions of 3D points 31 which belong to the connected sets 32 are used as the basis to determine positions and postures which represent the connected sets 32, defined as the representative positions and postures 33, and to determine hand positions and postures 34 corresponding to the representative positions and postures 33 (step S3 and step S4). Due to this, the positional relationship between the articles 20 and hand 14 can be suitably set in accordance with the type, etc. of the hand 14.

(4) Due to the processing at the robot control device 13 (step S3), if combining center of gravity positions of 3D points 31 which belong to connected sets 32 and predetermined postures at the center of gravity positions to determine representative positions and postures, it is possible to stably hold held articles 21 by the hand 14. When the positions of 3D points 31 which belong to the connected sets 32 are used as the basis to determine flat surfaces or curved surfaces and the positions of single points on the determined flat surfaces or curved surfaces and the postures based on the normal directions of the flat surfaces or curved surfaces are combined to obtain representative positions and postures 33, if the surfaces of the articles 20 are inclined, it is possible to calculate the representative positions and postures 33 in accordance with that inclination.

(5) For articles 20 which have holes at the surface, the positions of the 3D points 31 which belong to the connected sets 32 are used to determine the holes and the positions and postures (directions of holes) of the holes are defined as the representative positions and postures 33, so it is possible to hold articles 20 by gripping them from the inside using the hand with the holder 14a configured by the chuck.

So long as measuring surface positions of a plurality of articles 20 stored in bulk by a 3D measuring device 11 to acquire position information of a plurality of 3D points 31, determining connected sets 32 made by connecting together 3D points 31 near each other from the plurality of 3D points 31, identifying the positions and postures of articles which can be taken out based on position information of the 3D points 31 belonging to the connected sets 32, determining the hand positions and postures 34 corresponding to those positions and postures, and controlling the robot 12 to move the hand 14 to the hand positions and postures 34 and take out the articles 20 (held articles 21), the article take-out method may be configured in any way.

Figure 16:
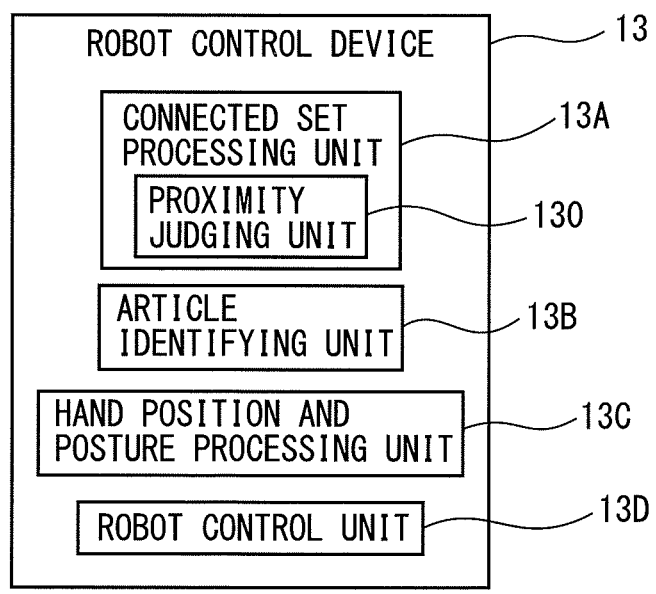
FIG. 16 is a block diagram which shows an internal configuration of a robot control device of FIG. 1.

FIG. 16 is a block diagram which shows an internal configuration of the robot control device 13 of FIG. 1. The robot control device 13 has a connected set processing unit 13A, an article identifying unit 13B, a hand position and posture processing unit 13C, and a robot control unit 13D. The connected set processing unit 13A has a proximity judging unit.

In the above embodiment, the hand 14 is provided with two holders 14a. However, three or more holders 14a may be provided or just one may also be provided. When the distance according to a predetermined coordinate system between a first 3D point 31 (for example, 311 of FIG. 15) and a second 3D point 31 (for example, 312 of FIG. 15) which belong to the 3D point set 30 is within a predetermined distance, the first 3D point 311 and the second 3D point 312 are connected to calculate a connected set 32 (step S2). However, so long as a connected set 32 is determined by using 3D points 31 and 31 close to each other and connecting together them, the configuration of the connected set processing unit 13A is not limited in configuration to the one explained above.

The position information of 3D points belonging to connected sets 32 is used as a basis to calculate the representative positions and postures 33 which represent the connected sets 32 (step S3). However, so long as identifying the positions and postures of the articles 20 which are expressed by the connected sets 32, the configuration of the article identifying unit 13B is not limited to the one explained above. Here, the positions and postures which represent connected sets 32 are also positions and postures which represent articles 20. Therefore, identifying the positions and postures of articles 20 means determining the positions and postures which represent articles to identify the arrangement of articles 20.

In the above embodiment, the hand positions and postures 34 are calculated from the representative positions and postures 33 (step S4). However, so long as determining the hand positions and postures 34 identified as representative positions and postures 33 which enable identified articles 20 to be taken out, the configuration of the hand position and posture processing unit 13C is not limited to the one explained above. So long as controlling the robot 12 so as to move the hand 14 to the hand positions and postures 34 to take out articles 20, the configuration of the robot control unit 13D may be configured in any way.

That is, the configuration of the above-mentioned article take-out apparatus 10 (FIG. 1) is just one example. The connected set processing unit 13A (step S2), article identifying unit 13B (step S3), hand position and posture processing unit 13C (step S4), and robot control unit 13D (step S8 to step S10) comprised of the robot control device 13 are not limited in configuration to the ones explained above.

The above embodiments may be freely combined with one or more of the modifications.

According to the present invention, when recognizing the positions and postures of articles stored in bulk in a 3D space, connected sets are determined from the position information of the plurality of 3D points which are acquired by the 3D measuring device and the connected sets are used to identify the positions and postures of the articles. Therefore, it is possible to recognize the positions and postures of the articles without preparing model patterns of articles. Even with a large number of types of articles or with irregularly shaped articles, it is possible to easily recognize their positions and postures and hold the articles. In particular, this is suitable for recognition of the positions and postures of articles which have surfaces of flat surface shapes or gentle curved surface shapes and holding of those articles.

While the present invention has been described with reference to the preferred embodiments thereof, a person skilled in the art would understand that various corrections and modifications may be made thereto without departing from the scope of disclosure of the later explained claims.

The invention claimed is:

1. An article take-out apparatus, comprising:
    a robot having a hand capable of holding an article;
    a 3D measuring device measuring surface positions of a plurality of articles stored in bulk in a 3D space so as to acquire position information of a plurality of 3D points;
    a connected set processing unit determining connected sets made by connecting 3D points which are close to each other, from the plurality of 3D points acquired by the 3D measuring device;
    an article identifying unit identifying positions and postures of the articles, based on position information of 3D points belonging to the connected sets, wherein the article identifying unit determines positions and postures representing the connected sets, based on positions of 3D points belonging to the connected sets;
    a hand position and posture processing unit determining positions and postures of the hand capable of taking out the articles, the positions and postures of the articles being identified by the article identifying unit, wherein the hand position and posture processing unit determines the positions and postures of the hand corresponding to the positions and postures determined by the article identifying unit; and a robot control unit controlling the robot to move the hand to the positions and postures determined by the hand position and posture processing unit and take out the articles, wherein the article identifying unit is configured to identify the positions and postures of the articles, based on the position information of the 3D points belonging to the connected sets, and without using a model or pattern matching.

2. The article take-out apparatus according to claim 1, wherein the article identifying unit combines center of gravity positions of the 3D points belonging to the connected sets and predetermined postures at the center of gravity positions to determine the positions and postures representing the connected sets.

3. The article take-out apparatus according to claim 1, wherein the article identifying unit determines flat surfaces based on positions of the 3D points belonging to the connected sets and combines positions of single points on the flat surfaces and postures based on normal directions of the flat surfaces to determine the positions and postures representing the connected sets.

4. The article take-out apparatus according to claim 1, wherein the article identifying unit determines curved surfaces based on positions of the 3D points belonging to the connected sets and combines positions of single points on the curved surfaces and postures based on normal directions of the curved surfaces at the positions to determine the positions and postures representing the connected sets.

5. The article take-out apparatus according to claim 1, wherein the article identifying unit determines positions and postures of holes provided at articles, assuming that a closed region of a predetermined area or more where there are no 3D points is a hole, based on positions of the 3D points belonging to the connected sets and combines the positions and postures of the holes to determine the positions and postures representing the connected sets.

6. The article take-out apparatus according to claim 1, wherein the hand has either a suction nozzle, magnet, suction pad, or chuck.

7. An article take-out apparatus, comprising:
a robot having a hand capable of holding an article;
a 3D measuring device measuring surface positions of a plurality of articles stored in bulk in a 3D space so as to acquire position information of a plurality of 3D points;
a connected set processing unit determining connected sets made by connecting 3D points which are close to each other, from the plurality of 3D points acquired by the 3D measuring device;
an article identifying unit identifying positions and postures of the articles, based on position information of 3D points belonging to the connected sets, wherein the article identifying unit determines positions and postures representing the connected sets, based on positions of 3D points belonging to the connected sets;
a hand position and posture processing unit determining positions and postures of the hand capable of taking out the articles, the positions and postures of the articles being identified by the article identifying unit, wherein the hand position and posture processing unit determines the positions and postures of the hand corresponding to the positions and postures determined by the article identifying unit; and
a robot control unit controlling the robot to move the hand to the positions and postures determined by the hand position and posture processing unit and take out the articles,
wherein the plurality of 3D points acquired by the 3D measuring device form a 3D point set, and
wherein the connected set processing unit has a proximity judging unit judging if a distance between a first 3D point and a second 3D point belonging to the 3D point set relating to a predetermined coordinate system is within a predetermined distance, and connects the first 3D point and the second 3D point when it is judged by the proximity judging unit that the distance between the first 3D point and the second 3D point is within the predetermined distance.

8. An article take-out method of taking out articles stored in bulk in a 3D space by using a robot having a hand capable of holding an article, comprising:
measuring surface positions of a plurality of articles stored in bulk by a 3D measuring device to acquire position information of a plurality of 3D points;
determining connected sets made by connecting 3D points which are close to each other, from the plurality of 3D points acquired by the 3D point measuring device;
identifying positions and postures of articles by determining positions and postures representing the connected sets, based on position information of 3D points belonging to the connected sets;
determining positions and postures of the hand capable of taking out the articles, the positions and postures of the articles being identified, the positions and postures of the hand corresponding to the positions and postures representing the connected sets; and controlling the robot to move the hand to the positions and postures of the hand and take out the articles, wherein said identifying comprises identifying the positions and postures of the articles by determining the positions and postures representing the connected sets, based on the position information of the 3D points belonging to the connected sets, and without using a model or pattern matching.

* * * * *